April 28, 1942.   G. E. DENMAN   2,280,897
FLUID CONTROLLED BRAKE
Filed May 17, 1941
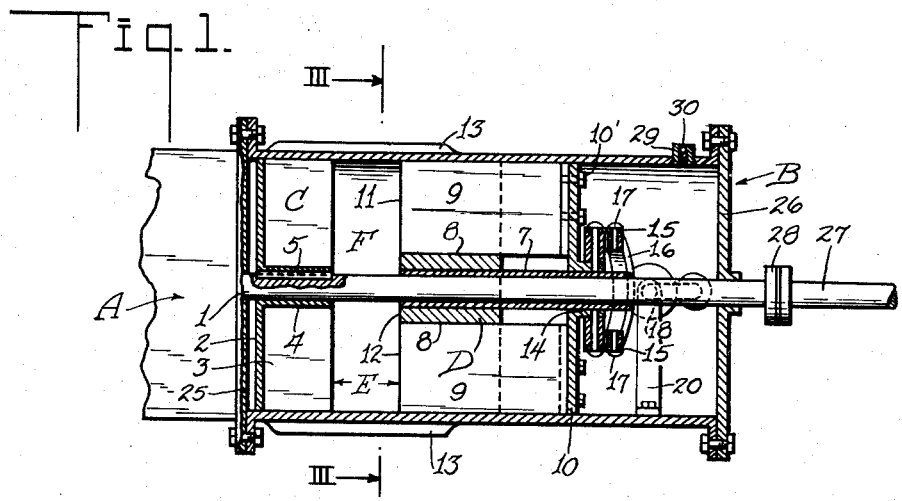
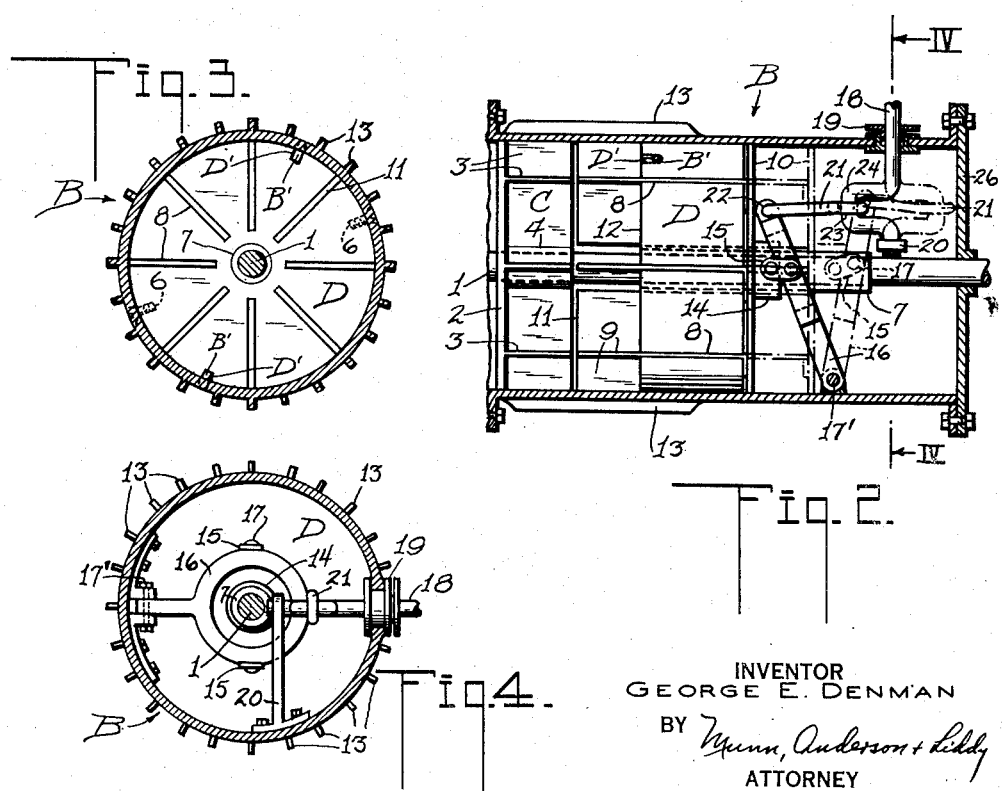
INVENTOR
GEORGE E. DENMAN
BY Munn, Anderson + Liddy
ATTORNEY Patented Apr. 28, 1942

2,280,897

UNITED STATES PATENT OFFICE 2,280,897

FLUID CONTROLLED BRAKE

George E. Denman, Oakland, Calif.

Application May 17, 1941, Serial No. 393,969

4 Claims. (Cl. 188—90)

The present invention relates to improvements in a fluid controlled brake, and it consists of the combinations, constructions and arrangements hereinafter described and claimed.

An object of my invention is to provide a fluid controlled brake in which an impeller is rotated by the member on which a braking force is to be applied and a stator which has vanes manually movable toward and away from the impeller, both impeller and stator blades being immersed in a fluid whereby the degree of braking force applied to the impeller is directly proportional to the distance separating the impeller blades from the stator blades. As already stated, I employ manually controlled means for moving the stator with respect to the impeller and when the device is used on an automobile the manually controlled means may be actuated by a foot pedal.

Where the device is used on a vehicle, it is to be used in connection with a mechanical brake which will hold the vehicle against movement after the fluid controlled brake has brought the vehicle to a stop. This is necessary should the vehicle be brought to a stop on a hill. Without the mechanical brake applied, the vehicle would have a tendency to creep. It is possible to use two of the devices on the two vehicle axles that extend from a differential and when this is done each braking device will operate independently on its respective axle and wheel, thus permitting both fluid controlled brakes to be applied to their respective axles while the vehicle is rounding a curve. The device is simple in construction and will not burn out even though under constant use as is true with brakes using brake bands, since the braking force is not absorbed by a brake band frictionally engaging with a brake drum but is absorbed by the impeller blades forcing a fluid against stator blades.

Other objects and advantages will appear in the following specification, and the novel features of the device will be particularly pointed out in the appended claims.

My invention is illustrated in the accompanying drawing forming a part of this application, in which:

Figure 1 is a longitudinal section through the device and shown operatively applied to a fluid drive mechanism;

Figure 2 is a horizontal plan view of the mechanism showing the housing or casing in section;

Figure 3 is a section along the line III—III of Figure 1; and

Figure 4 is a section along the line IV—IV of Figure 2.

While I have shown only the preferred form of my invention it should be understood that various changes or modifications may be made within the scope of the appended claims without departing from the spirit of the invention.

In carrying out my invention I make use of a rotatable shaft 1 that may be driven by a fluid drive mechanism of an automobile. The fluid drive mechanism is indicated diagrammatically at A in Figure 1. The housing for the fluid drive mechanism A is held stationary. I do not wish to be confined to any particular mechanism for rotating the shaft 1 since the purpose of the invention is only to apply a braking force on the shaft 1 in order to bring it to a stop. The shaft therefore may be rotated by any mechanism, such as an axle, not shown, that extends from a differential in an automobile or truck.

The shaft 1 projects into a housing or casing B of my fluid controlled brake and an impeller indicated generally at C is disposed in the housing and keyed to the shaft. The housing B is bolted to the housing of the drive mechanism A and is therefore held stationary. The impeller C has a disc 2 and radially extending blades or vanes 3. The disc has an integral hub 4 which receives the shaft 1 and the hub preferably projects only from one side of the disc. The blades are integral with the hub and as already stated project radially therefrom. The blades are also integral with the disc 2. The hub is keyed to the shaft 1 at 5.

Within the housing B, I also mount a stator indicated generally at D. The stator has a cylindrical periphery that fits snugly in the housing B and the stator is preferably moved into the housing from the right hand end before the end plate is bolted in place. Grooves D' in the stator periphery, see Figure 2, receive pins B' carried by the housing and correctly position the stator in the housing. The stator is now rigidly secured to the housing B by screws 6 or other suitable fastening means, see Figure 3, that extend through the housing wall and into the body of the stator. The stator has a centrally disposed bearing sleeve 7 for rotatably receiving the shaft 1 and also has a plurality of radially extending slots 8. Stator blades or vanes 9 are slidably mounted in the slots 8 and are connected to a movable disc 10 by cap screws 10' or other suitable fastening means. There are preferably as many blades on the stator as there are blades on the impeller or rotor. It will be noted from Figure 1 that the stator is spaced a distance E from the rotor. When the brake is not in use, the free edges 11 of the stator blades are disposed flush with the face 12 of the stator. This will provide an empty compartment F disposed between the rotor and the stator in which the fluid that fills the housing B can be rotated when the rotor or impeller C is rotated by the shaft 1.

When a braking action is to be applied to the shaft 1, the stator blades 9 are moved longitudinally in their slots 8 toward the rotor blades 3 and the blades 9 will therefore project into the compartment F and tend to stop the free rotation of the fluid in the compartment. The braking force is proportionately increased as the blades 9 are moved toward the blades 3 and the greatest braking effect is produced when the blades 9 are fully advanced as illustrated in Figure 2. When this occurs the fluid in the compartment F cannot freely rotate because it strikes the stator blades and it is this restriction on the fluid flow which applies the braking force to the shaft 1. There is sufficient play between the vanes 9 and stator slots 8 to permit a slight leakage of fluid from the compartment F to the other side of the stator. The fluid that is forced from the compartment F is that which is displaced by the vanes 9 entering the compartment. The leakage is too slight to detract from the braking force of the trapped fluid in the compartment F. Heat will be generated while the braking action is in force and I provide the housing B with fins 13 for dissipating the heat.

I will now describe the mechanical means for moving the disc 10 and blades 9 toward and away from the blades 3. The disc 10 has a hub 14 that slides on the sleeve 7. Links 15 are pivotally secured to the hub 14 and are disposed diametrically opposite to each other. The links are also pivotally secured to a ring-shaped gate 16 at 17. Figures 2 and 4 illustrate the gate 16 as being pivotally mounted at 17' to the interior surface of the housing B. The gate can be swung from the full line position into the broken line position, illustrated in Figure 2. When the gate is in the full line position, the greatest braking force is being applied to the shaft 1; and when the gate is in the broken line position, the brake is entirely released.

Any means desired may be used for swinging the gate into its two extreme positions and for holding the gate at any desired point between these two extremes. I illustrate one mechanism for swinging the gate and it comprises a crank 18 rotatably mounted in a packing gland 19 carried by the housing wall; and the packing gland permits the crank to extend through the housing B without the loss of any fluid. The inner end of the crank is supported by a standard 20. A link 21 is pivotally connected at 22 to the gate ring 16 and is also pivotally connected at 23 to the crank throw 24. The arrangement is such that when the crank 18 is moved through an arc of 180°, it will swing the gate from one extreme position to the other. It is obvious that the crank does not need to be rotated through 180° to effect this complete movement of the gate since a greater crank throw would accomplish the same link movement with a less degree of crank rotation. Furthermore, the gate can be held at any desired position between its two extreme points to apply the proper braking force to the shaft 1.

The ends of the housing B are closed by end plates 25 and 26 and if desired, the end plate 25 may also be the end plate for the fluid drive housing A. The shaft 1 extends entirely through the housing B and is connected to a propeller shaft 27 by a universal joint 28.

From the foregoing description of the various parts of the device, the operation thereof may be readily understood.

In the adaptation of the device to an automobile as illustrated in Figures 1 and 2, the shaft 1 is rotated by the fluid drive mechanism A which in turn receives its power from the engine, not shown. As already stated, the shaft 1 may be connected to any rotating mechanism which it is desired to bring to a stop. The shaft 1 is free to rotate so long as the blades 9 are received in the slots 8 and the edges 11 of the blades lie flush with the face 12 of the stator.

When applying the brake to the shaft 1, the crank shaft 18 is gradually rotated through an arc and this will swing the gate which in turn will advance the stator blades 9 toward the rotor blades 3. Since the housing is entirely filled with fluid, a portion of this fluid which is rotating in the compartment F will be trapped by the stator blades 9 and will exert a retarding force on the rotor blades 3. This retarding force will slow up the rotation of the rotor blades and is the same as applying a braking force to the shaft 1. The force can be increased as the stator blades 9 are moved toward the rotor blades 3. The braking action is gently applied due to the fluid connection between the stator blades and the rotor blades and yet the rotation of the shaft 1 can be quickly stopped by merely advancing the blades 9 into the position shown in Figure 2 where they will be disposed close to the blades 3. Any desired means may be used for preventing the stator blades from being moved into actual contact with the rotor blades. The disc 10 is illustrated as striking the stator D before the blades 9 strike the blades 3 and this constitutes a positive stop that will prevent the two sets of blades from clashing.

The housing B is kept full of fluid. In case there should be a loss of fluid from any cause whatsoever, I provide the housing with an inlet 29 that has a check valve 30 therein. Additional fluid may be added to the housing as needed and the check valve will retain the fluid in the housing.

I claim:

1. A fluid controlled brake comprising a casing for holding a fluid, a rotor mounted in the casing and being attachable to a member that is to be braked, radially-extending blades on the rotor, a stator rigidly mounted in the casing and having radially extending slots, said stator being disposed a predetermined distance from the rotor blades, a second group of movable blades slidably mounted in the stator slots, and common means for simultaneously moving all of the second set of movable blades toward or away from the rotor blades for applying a desired degree of braking force to the rotor.

2. A fluid controlled brake comprising a casing containing a fluid, a rotor mounted in the casing and consisting of a disc with radially extending blades projecting laterally from one face of the disc, a shaft connected to the rotor, a stator mounted in the casing and having a flat surface spaced a predetermined distance from the rotor, said rotor having longitudinally movable blades that are held against rotation and whose outer edges normally lie flush with the stator flat surface, and means for moving the stator blades toward and away from the rotor blades, said stator blades extending radially from the shaft axis, whereby when the stator blades are moved toward the rotor blades, the fluid moved by the rotating rotor blades will strike the stator blades resulting in a braking action being applied to the rotor blades and shaft in direct ratio to the closeness of the stator blades to the rotor blades.

3. In a fluid controlled brake, a rotatable shaft, a rotor rigidly mounted thereon and having laterally extending and radially mounted blades, a fluid holding casing enclosing the rotor, a stator rigidly mounted in the casing and having longitudinally movable but non-rotatable blades, a disc connected to all of the stator blades for moving them toward and away from the rotor blades, said stator blades extending radially away from the same axis as the rotor blades, and means for moving the stator blade disc for advancing the stator blades to the desired position with respect to the rotor blades, whereby the rotor blades will move the fluid against the stator blades to create a braking action on the rotor blades and shaft.

4. In a device of the type described, a rotor having radially extending blades, a stator having radially extending blades, means for moving the stator blades toward and away from the rotor blades and including a disc, a hinged gate operatively connected to the disc, a link for swinging the gate, and a crank for actuating the link, said crank being rotatable into the desired angular position for moving the stator blades to the required distance from the rotor blades for applying the proper degree of braking force to the rotor.

GEORGE E. DENMAN.